(No Model.)
J. E. SIMMS.
NUT LOCK.
No. 515,372. Patented Feb. 27, 1894.
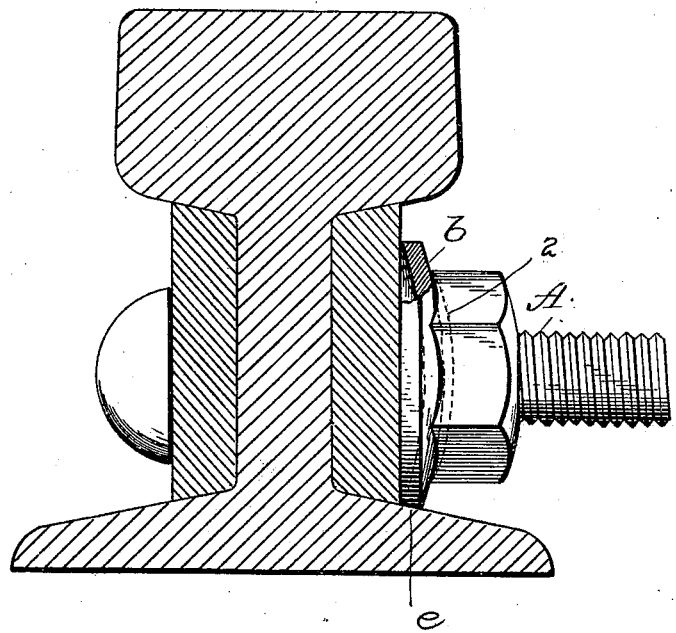
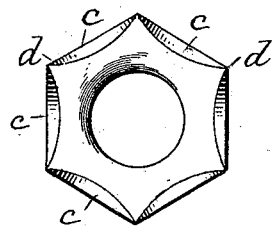
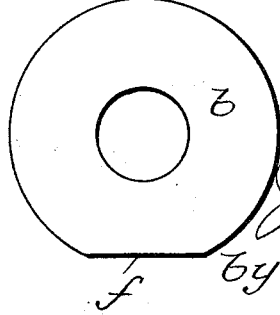
Attest
Willer Mallby
F. L. Middleton
Inventor
Joseph E. Simms
by Ellis Spear
Atty

UNITED STATES PATENT OFFICE.

JOSEPH ELLIOTT SIMMS, OF CHARLESTON, WEST VIRGINIA.

NUT-LOCK.

SPECIFICATION forming part of Letters Patent No. 515,372, dated February 27, 1894.

Application filed June 17, 1893. Serial No. 477,945. (No model.)

*To all whom it may concern:*

Be it known that I, JOSEPH ELLIOTT SIMMS, a citizen of the United States of America, residing at Charleston, in the county of Kanawha and State of West Virginia, have invented certain new and useful Improvements in Nut-Locks, of which the following is a specification.

My invention is an improvement in that class of nut locks in which a spring washer is located about the bolt and directly underneath the nut for the purpose of holding the nut in place, and for compensating for the expansion and contraction due to changes in temperature.

My invention consists of a concavo-convex elastic washer in combination with a special form of concave nut, as hereinafter explained, and as illustrated in the accompanying drawings, in which—

Figure 1, shows the nut washer and bolt, in side elevation. Fig. 2, shows the under face of the nut. Fig. 3 is a face view of the washer.

In the drawings A represents the bolt of ordinary construction. It is the common form of bolt used in railway splices. The washer *b* is concavo-convex in form, and is made of sheet spring steel of suitable thickness. It is arranged with the concave face inward, or bearing upon the fish plate, or angle iron (for example) of the railway splice. But it is adapted to bear on any equivalent surface.

The nut is of any convenient polygonal contour, and of ordinary shape on its upper side. The under surface however, is concave, and the concavity is made on a circle smaller than that of the washer, as shown in dotted lines Fig. 1 at *b* so that the outer edge of the nut bears upon the outer face of the washer, on a line between the center of the washer, and the periphery, it being understood that the washer, as usual, is larger in diameter than the nut. Thus, when the nut is screwed down upon the washer, it presses upon it on a line within the bearing so as to take advantage of the yielding of the washer, and at the same time, it bears at the outer edge of the nut and holds most firmly against turning. To further effect this purpose, I reduce the edge of the nut on a curve preferably, between the corners as at *c*, where the edge is formed on a curve between the angles, leaving points *d, d*, which are by the pressure, pinched into the washer, and thereby are held firmly. Where a lateral bearing may be secured, as when an angle iron is used, as shown at *e*, the edge of the washer is formed on one side with a straight edge *f* which bears on the flange, and prevents the washer from turning.

The concave face of the nut may closely approximate the convex form of the outer face of the washer.

I claim—

In combination with a concavo-convex washer, a polygonal nut having a concave under face, and having the edges reduced between the corners to form points *d*, adapted to engage the smooth convex face of the washer substantially as described.

In testimony whereof I affix my signature in presence of two witnesses.

JOSEPH ELLIOTT SIMMS.

Witnesses:
 GUS HENRY,
 G. O. WEEDEN.